March 9, 1943.  J. I. LINER  2,313,649
THERMO-ELECTRIC INDICATOR
Filed June 22, 1936  2 Sheets-Sheet 1
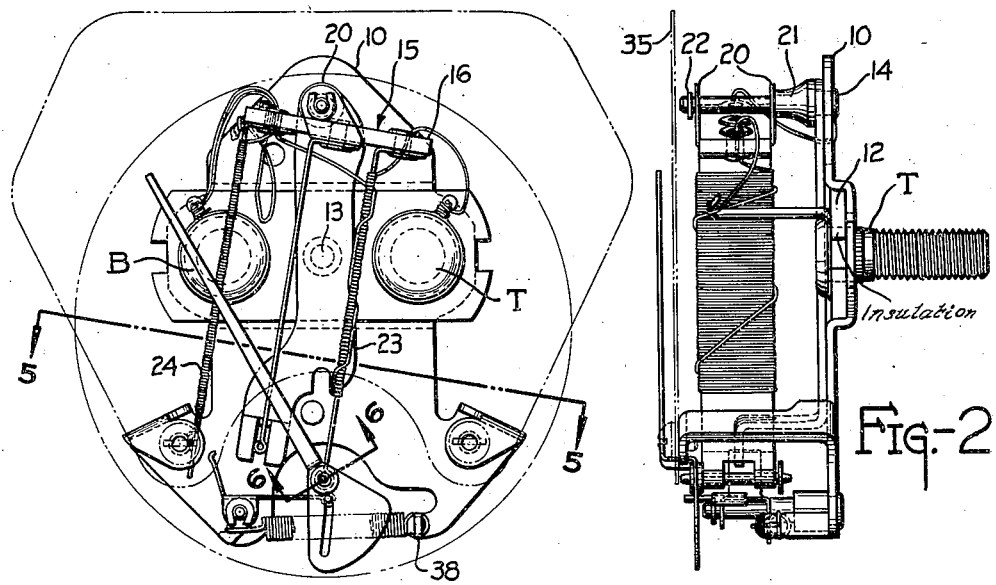
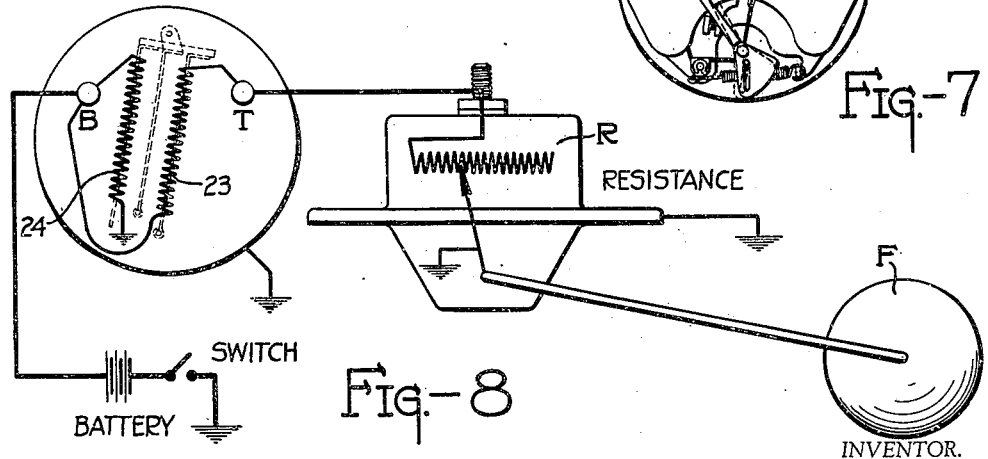
INVENTOR.
JOSEPH I. LINER
BY
D. Henry Stoltenberg
ATTORNEY.

March 9, 1943.  J. I. LINER  2,313,649
THERMO-ELECTRIC INDICATOR
Filed June 22, 1936  2 Sheets—Sheet 2
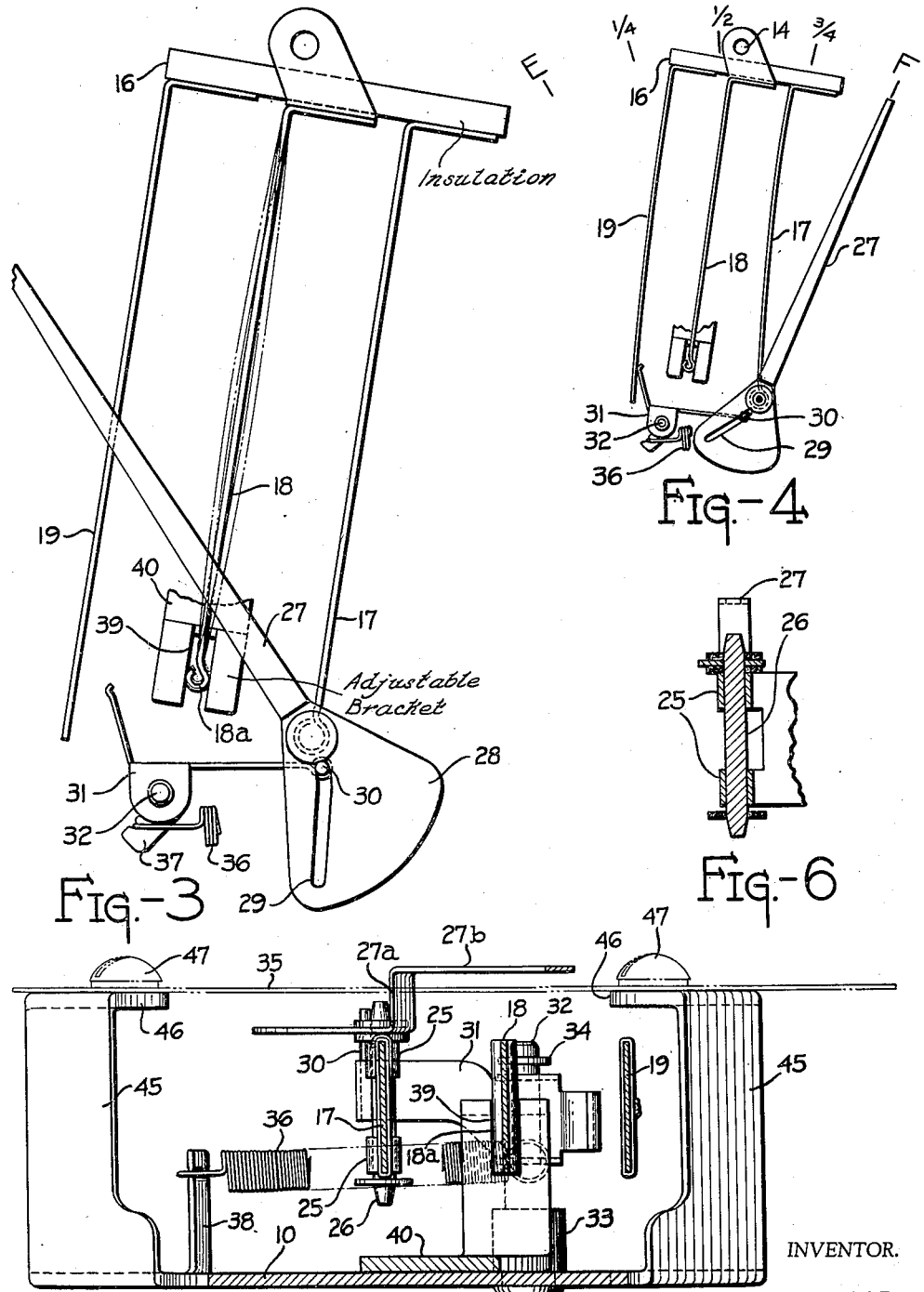
INVENTOR.
JOSEPH I. LINER
BY
D. Henry Stoltenberg
ATTORNEY.

Patented Mar. 9, 1943

2,313,649

UNITED STATES PATENT OFFICE 2,313,649

THERMOELECTRIC INDICATOR

Joseph I. Liner, Toledo, Ohio, assignor to The Electric Auto-Lite Company, Toledo, Ohio, a corporation of Ohio Application June 22, 1936, Serial No. 86,576

9 Claims. (Cl. 171—95)

This invention relates to indicating devices, more particularly to thermostatic liquid level indicators, in which the datum whose level is to be observed is located at a distance from the indicating devices.

The invention contemplates the provision of an indicator which registers variations in the level of a datum for use with the ordinary rheostatic float control well known in the art. The indicator means is provided with an actuating device employing three thermal elements each responsive to a determinative function of the desired reading; the deflection of one of the elements being responsive to the changes in the datum to be measured; the deflection of the second element being responsive to the variations in the ambient temperature; and the deflection of the third element being responsive to variations in voltage of the electromotive force of the supply of electrical energy. These three thermal elements are provided with a mechanism to deflect a pointer or other indicia, to give a true reading of changes in level of the datum, irrespective of variations in temperature or the electromotive force of the energy source.

The invention further contemplates the provision of a non-precision instrument with a slow response, especially suitable for measuring the gasoline level in a tank of an automobile, where an approximate reading is adequate. It is essential to have an integrating indicating device which will have considerable inertia in responding to the impulses arising from sudden changes of level in the tank, so that the indicating pointer will be steady, and give an average reading of the variations.

To attain these ends, a thermo-electric system is provided, in which electric heating coils vary the temperature of bimetallic strips whose deflections actuate an indicator pointer, the inherent slowness of movement of the bimetallic strips acting as an integrator for the current values as varied by the liquid level through the action of a rheostatic float control. The readings of the indicator pointer are corrected for ambient temperature variation and for electromotive force variation of the source of electrical energy.

The temperature and voltage compensating devices are positioned adjacent the indicator pointer to make a compact instrument, cheap to manufacture and rugged during operation.

It is a further object of this invention to provide a thermostatic gauge having electric heating elements cooperating with thermo-responsive elements in circuit at all times with a source of electrical energy, the voltage compensation being obtained by a variable lever system cooperating with the indicating means and actuated by a thermo-responsive element whose temperature is proportional to the applied voltage.

It is a further object of this invention to provide a unitary indicating device compensated for voltage and ambient temperature variation capable of being used with a rheostatic control.

It is a further object of this invention to provide a thermostatic liquid level gauge which is cheap to manufacture and which is rugged under normal operating conditions of an automobile.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like characters designate corresponding parts in the several views.

Figure 1 is a plan view with the scale in phantom.

Figure 2 is an elevational view.

Figure 3 is an enlarged plan view of the actuating mechanism.

Figure 4 is a view similar to Figure 3 showing the parts of the actuating mechanism displaced with the scale division indicated.

Figure 5 is an elevational view partly in section taken along line 5—5 of Figure 1.

Figure 6 is a sectional elevation taken along line 6—6 of Figure 1.

Figure 7 is a plan view of the indicating scale and pointer.

Figure 8 is a diagrammatic sketch of connections of the indicator.

Referring to Figure 1 of the drawings, there is provided a recessed mounting plate 10 having binding posts B, T positioned thereon and insulated therefrom by means of an insulating strip 12. The insulating strip 12 fits snugly into the recess of the mounting plate 10 and is held in position by any convenient means as, for example, by rivet 13. Binding posts B, T form a means whereby the complete instrument may be mounted upon a panel or the like and at the same time provide convenient means for completing an electric circuit through the instrument.

On the upper end of the mounting plate 10 (Figure 2), there is provided a pivot pin 14 which may conveniently be riveted into position on the mounting plate. The pin 14 provides a pivot about which an actuating assembly 15 rotates under the influence of ambient temperature. The actuating assembly 15 comprises in general a supporting strip 16 of insulating material to which three bimetallic strips or elements 17, 18, and 19 are riveted in parallel juxtaposition as is clearly shown in Figures 1 and 3. In order that the actuating assembly may be pivotally mounted on the pin 14, a stirrup 20 is provided which may be attached to the supporting strip 16 by means of the same rivet attaching the central bimetallic strip thereto. The stirrup 20 has two lateral projections which are apertured to fit the pin 14, and is held in position for rotation in one plane on the pin 14 by means of a retaining collar 21 and a split washer 22 which cooperates with the pin 14.

Two of the bimetallic strips or elements 17 and 19 are provided with thermostatic elements or heater units 23 and 24 which may consist of resistance wire wound closely around the elements so that when an electric current is caused to flow through the resistance wire, heat will be generated and the bimetallic strip will be subjected to a higher temperature than normal and will bend proportionally to the amount of current flowing through the resistance wire. In this manner, the bending of the strips 17 and 19 can be made proportional to extraneous determinative conditions.

The heater element 23 on the bimetallic strip 17 may be placed in circuit with an electromotive force and a control means such as a rheostatic float control or the like so that the current flowing through the resistance wire of the heater element will be proportional to variations in a selected extraneous condition as, for example, changes in the level of the datum of the gasoline in the tank of an automobile. The heater element 24 on the bimetallic strip 19 may also be placed in circuit with the same electromotive force employed in the circuit with the heater element 23 so that other extraneous determinative conditions may affect the flexing of the bimetallic strip 19 as, for example, changes in the electromotive force of the source of energy employed in the circuit. The central bimetllic strip 18 may be left in bare condition so that it will respond to the ambient temperature within the case of the instrument.

The free end of the bimetallic strip 17 is provided with a bearing means 25 (Figure 6) in which an axle 26 of a pointer 27 is journaled to allow free rotation thereof. Pointer 27 may be provided with a depending plate 28 (Figure 3) in which an elongated slot 29 is cut. A pin 30 is provided to ride freely in the slot 29 so as to form a fulcrum about which the pointer 27 may be moved under the influence of the bimetallic strip 17. In order that the position of the fulcrum pin 30 may be changed, the pin is attached to one arm of a bellcrank 31 which is pivoted about a stud 32, riveted in position upon the mounting plate 10. The bellcrank 31 is provided with two laterally extending flanges which are apertured to fit the pivot stud 32, the whole assembly being held in position for rotation in one plane by means of a retaining collar 33 and a split washer 34. The other arm of the bellcrank 31 extends laterally from the arm carrying the fulcrum pin 30 and is so positioned as to cooperate with the bimetallic strip 19.

As the bimetallic strip 19 bends to the right (Figure 3), under the influence of the heater element 24, it will thrust the lateral arm of the bellcrank 31 in the same direction so as to advance the fulcrum pin 30 down in the slot 29 of the depending plate 28. In this manner, the lever distance or movement arm between the pivotal point of the pointer 27 and the fulcrum pin 30 will be elongated so that greater movement is necessary on the part of the bimetallic strip 19 under the influence of the heater coil 33 to give the same displacement of the pointer 27 with regard to a scale 35. A resilient means 36 is provided to urge the bellcrank 31 in a counter-clockwise direction, the means acting between a projection 37 on the bellcrank and an anchor stud 38 upon the mounting plate 10. By bending the anchor stud 38, the tension of the resilient means 36 may be controlled, the tension having a vital effect upon the sweep of the pointer.

The free end of the center bimetallic strip 18 is provided with a loop 18a which coacts with a slot 39 formed in a bracket 40 positioned adjacent the mounting plate 10 and adapted to be pivoted about the pin 14. The bracket 40 is preferably made adjustable about the pin 14 to give a convenient means for adjusting the zero position of the pointer 27 by changing the position of the slot 39. The slot 39 is provided as a guide for the free end of the bimetallic strip 18 so that the flexure of the strip 18 will be effective to displace the supporting strip 16 about the pivot pin 14, by retaining the movement of the loop 18a in a definite plane.

Brackets 45 are struck up from the supporting frame 10, and provided with apertured flanges 46, with which the scale 35 cooperates. Screws 47 may be provided to hold the scale 35 in close juxtaposition with the flanges, the apertures therein being threaded to fit them. The pointer 27 is bent outwardly at 27a and then upwardly at 27b to move in parallel relation with the scale 35. Stops 48 may be provided on the scale if desired to limit the movement of the pointer.

The heating coils 23 and 24 are placed in circuit with a source of electrical energy, the coil 23 also being in circuit with a current-controlling device cooperating with a selected datum as; for example, the float control resistance diagrammatically illustrated in Figure 8. A housing R is provided in which is mounted a coil of wire resistance upon a form of any convenient contour, wherewith a slide cooperates. The slide is controlled by a lever mechanism actuated by the float F which is moved by changes in a datum in the well known manner. The variations in the datum change the values of the current flowing through the heater coil 23 by either increasing or diminishing the same so that the thermostatic element 17, cooperating with the heater coil, may be subjected to a higher or a lower temperature in direct proportion to the amount of current flowing in the heater coil.

To attain this result, the heater coil is placed in series with the source of electrical energy, as for example, a battery, and the variable resistance under the control of the float F. The heater coil 24 is connected directly in parallel with the source of electrical energy so that current flowing therein will be directly proportional to the electromotive force of the energy source. As shown in Figure 8, portions of the circuit are grounded for convenience.

The operation of the indicating device is as follows: Assuming that the electrical circuits are de-energized through the agency of the switch shown in Figure 8, the three bimetallic strips, 17, 18, and 19, will be affected alone by the temperature within the casing. Under these conditions, they will be in parallel relation. Adjustment of the zero position of the pointer may be made at this time through manipulation of the movable bracket 40 which establishes the relation between the slot 39 and the loop 18a postioned on the free end of the bimetallic strip 18. The bimetallic strip 18 is affected alone by the ambient temperature within the casing and, by establishing the relation of the actuating element 15 with reference to the fixed point 32, the zero reading of the pointer 27 may be established. This is accomplished by moving the bracket 40 about the pivot pin 14. Once the zero position has been determined, the bracket 40 is locked in position by any convenient means as; for example, by an adhesive substance being placed between the lower side of the bracket 40 and the frame member 10.

The zero position of the pointer as shown in Figure 7 allows it to contact the stop pin 48, the pointer being displaced slightly to the left of the actual empty reading of the indicating means as shown in phantom. This reading below E or empty on the scale is desirable so that an operator has an indication as to the operativeness of the mechanism at the time he closes the circuit switch, energizing both heater coils 23 and 24.

Assuming that the switch is open, with the pointer 27 resting against the stop pin 48, as shown in Figure 7, the conditions within the casing are determined by the ambient temperature therein. Upon closure of the switch, the electrical circuits to both coils will immediately be energized and even though the datum to be measured is at its lowest possible point by cutting in; for example, all the resistance, the pointer 27 will still advance to the right and clear the stop pin 48 and approach the E or empty calibration of the scale, thereby clearly indicating that the device is operative. For variations in the datum, the value of the resistance in the circuit will vary and determine the amount of current flowing through the heater coil 23, while the current flowing through the heater coil 24 will be substantially constant, depending upon the electromotive force of the energy source.

The heater coil 24 directly affects the bending of the bimetallic element 19 about which it is positioned. Similarly, the coil 23 will affect the bending of the bimetallic strip 17. The bellcrank 31, which is pivoted about the fixed point 32, is the connecting link between the bimetallic strips 17 and 19 and creates a lever system adapted to correct the deflection caused by the bimetallic strip 17 by changing the lever advantage; that is, distance between the fulcrum and the point of application of the force for moving the indicator pointer 27. When the electromotive force of the energy source has a definite value, a proportionate amount of current will flow through the heater coil 24, resulting in a definite displacement of the bimetallic strip 19 which, in turn, affects the heater coil 23 in a similar manner, assuming that the ambient temperature and the value of resistance in the circuit due to the float resistance are the same.

Then, for any change in the value of the electromotive force of the energy source, the bending of both strips 17 and 19 will be proportional but under an ordinary linkage therebetween, the reading of the indicating pointer 27 may be substantially affected to give a false reading of the status of the datum. It is, therefore, vital that a linkage between the elements 17 and 19 is such that even though the electromotive force of the energy source varies to effect bending of the bimetallic strips, the deflection of the indicator pointer 27 against the normal scale will be uneffected and gives an accurate reading of the position of the datum as determined by the value of the resistance placed in the circuit by the variable resistance. The bellcrank 31, the pin 30, and the slot 29 provide this linkage between bimetallic elements 17 and 19.

To correct the deflection of the bimetallic strips 17 and 19, as affected by ambient temperature, the third bimetallic strip 18, which is subject to the same conditions and, therefore, affected in the same manner, acts to deflect the supporting strip 16, carrying all three bimetallic elements in such manner that the linkage, as provided by the bellcrank 31, is unaffected by changes of ambient temperature to integrate the readings between the bimetallic strips 17 and 19. As pointed out before, this is accomplished through the medium of the slot 39 in the bracket 40 which cooperates with the loop 18a on the bimetallic strip 18. The slot 39 provides one plane of action for the loop 18a which will fulcrum the bimetallic strip 18 to effectuate the displacement of the actuating element 15 about the pivot point 14 to keep the relation between the pointer journal and the fixed point 32 constant. With variations in ambient temperature, this will result in a uniformity of readings of the indicating pointer 27 on the scale.

In Figure 4, there is illustrated the conditions of the mechanism when it is in operation. The function of the linkage described above with reference to the bellcrank 31 is clearly shown. It will be noted that the bimetallic strip 17 has the largest deflection.

In Figure 3, the action of the bimetallic strip 18 is shown, the positions thereof during variations of ambient temperature are shown in phantom.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

I claim:

1. In a device of the class described, indicating means, a pivot, a unitary electro-thermal actuating means mounted on the pivot for rotation thereabout, the actuating means comprising three thermostatic elements mounted in cooperative relation, two of the elements adapted to be responsive to externally controlled conditions, a second pivot adjacent the unitary actuating means, lever means cooperating with the second pivot and the two thermostatic elements responsive to externally controlled conditions to actuate the indicating means under varying lever advantages in response to the externally controlled conditions, means cooperating with the third thermostatic element to supply a fulcrum therefor to enable it to move the unitary actuating means about its pivot, and a resilient means cooperating with the lever means to restrain resiliently the operating elements.

2. The device defined in claim 1, in which the means cooperating with the third thermostatic element to supply a fulcrum therefor, is further characterized by being adjustable to enable an establishment of a definite relation between the axis of rotation of the indicating means and the second pivot to define the zero reading of the indicating means.

3. In a device of the class described, a unitary electro-thermal actuating means mounted on a pivot for rotation thereabout, the actuating means comprising three thermostatic elements mounted in cooperative relation, an electric heater coil adjacent the first thermostatic element supplied from a source of electrical energy having a variable voltage, the temperature of the first thermostatic element being varied proportionate to a physical effect to be measured, a second electric heater coil adjacent the third thermostatic element, the temperature of the second coil being varied proportionate to the electromotive force of the source of energy activating both coils, an indicating means, mounting means on the first thermostatic element to suspend the indicating means, a second pivot in fixed relation with the first pivot and adjacent the actuating means, lever means cooperating with the second pivot, one arm of which cooperates with the third thermostatic element, a second arm cooperating with the indicating means to provide a variable fulcrum to effectuate a displacement of the indicating means under the influence of the first thermostatic element, a resilient means cooperating with the lever means to return the lever means to an initial position, and an adjustable means cooperating with the second thermostatic element to provide a fulcrum therefor to move the unitary actuating means about its pivot in response to ambient temperature changes.

4. The device defined in claim 3, in which the variable fulcrum to effectuate a displacement of the indicating means under the influence of the first thermostatic element is further characterized by a pin and slot arrangement.

5. In a device of the class described, a pair of bimetallic elements, heater elements cooperating with each of the bimetallic elements energized from a common source of electrical energy, one of the heater elements adapted to vary the temperature of its bimetallic element in proportion to a physical effect, the other heater element adapted to vary the temperature of its bimetallic element in proportion to the voltage of the source of electrical energy, an indicating means pivoted on one of the bimetallic elements, a pivot, lever means cooperating with the pivot and adapted to cooperate with the second bimetallic element and the indicating means whereby the lever means acting about the pivot under the influence of the second element controls the rate of displacement of the indicating means by varying the lever advantage of the lever means as the indicating means is moved by the deflection of the element on which the indicating means is pivoted.

6. In a device of the class described, a pair of thermo-responsive elements, ambient temperature corrective means for the thermo-responsive elements, heater elements for the thermo-responsive elements supplied with electrical energy from a source having a variable voltage, one of the heater elements adapted to vary the temperature of its thermo-responsive element in proportion to a physical effect to be measured, the other heater element adapted to vary the temperature of its thermo-responsive element in proportion to the voltage of the energy source, lever means cooperating with one of the thermo-responsive elements, an indicating means adapted to be actuated by the second thermo-responsive element by means of the lever means, and a variable fulcrum under control of the thermo-responsive element cooperating with the lever means whereby the ratio of deflection between the actuating thermo-responsive element and the indicating means is varied to correct the readings of the indicating means for voltage variation.

7. In a device of the class described, a pair of thermo-responsive elements in substantial parallel relation and adapted to deflect toward each other upon increase in temperature, ambient temperature corrective means for the thermo-responsive elements, heater elements for the thermo-responsive elements to be energized from a source of electrical energy of varying voltage, one of the heater elements adapted to vary the temperature of its thermo-responsive element in proportion to a physical effect to be measured, the other heater element adapted to vary the temperature of its thermo-responsive element in proportion to the voltage of the source of electrical energy, indicating means including a lever system pivoted on one of the thermo-responsive elements, a pivot positioned adjacent the thermo-responsive elements, and a bell-crank cooperating with the pivot, one arm of the bell-crank cooperating with the second thermo-responsive element, and the other arm cooperating with the lever system, whereby the lever length in the lever system is controlled to correct for voltage variations.

8. In a device of the class described, a pair of thermo-responsive elements in substantially parallel relation, and relatively fixed adjacent one end, the free ends being adapted to deflect toward each other upon increase in temperature, ambient temperature corrective means for the thermo-responsive elements, heater elements for the thermo-responsive elements to be energized from a source of electrical energy of varying voltage, one of the heater elements adapted to vary the temperature of its thermo-responsive element in proportion to a physical effect to be measured, the other heater element adapted to vary the temperature of its thermo-responsive element in proportion to the voltage of the source of electrical energy, indicating means including a variable lever pivoted on the free end of one of the thermo-responsive elements, a pivot positioned adjacent the ends of the thermo-responsive elements, and a bell-crank cooperating with the pivot, one arm of the bell-crank cooperating with the second thermo-responsive element, and the other arm providing a fulcrum for the variable lever cooperating with the indicating means, whereby the length of the lever is controlled to correct for voltage variations of the source of electrical energy.

9. A thermally actuated electrical indicating instrument, comprising a scale and indicator movable thereover, a first temperature responsive unit including an electrical heating element in circuit with a source of voltage and responsive to a variable to be measured, means causing said temperature responsive unit to actuate said indicator, said means including adjustable means for modifying the actuation of said indicator in proportion to voltage variation of said source, a second temperature responsive unit including an electrical heating means responsive to variations in said source of voltage, said second temperature responsive means being operative to operate said adjustable means.

JOS. I. LINER.